United States Patent [19]

Splawn

[11] 4,127,252

[45] Nov. 28, 1978

[54] SUSPENSION SUPPORT UNIT FOR LARGE OBJECTS

[76] Inventor: Gary L. Splawn, Rte. 1, Chesnee, S.C. 29323

[21] Appl. No.: 820,573

[22] Filed: Aug. 1, 1977

[51] Int. Cl.² .............................................. B42F 13/00
[52] U.S. Cl. ...................................... 248/333; 294/74
[58] Field of Search ........................ 248/333, 334, 340; 294/74, 67 EA, 67 E

[56] References Cited

U.S. PATENT DOCUMENTS

| | | | |
|---|---|---|---|
| 2,793,904 | 5/1957 | Gale | 294/74 |
| 3,005,653 | 10/1961 | Becker | 294/74 |
| 3,456,976 | 7/1969 | Husmann | 294/74 |
| 3,743,341 | 7/1973 | Gale | 294/74 |

FOREIGN PATENT DOCUMENTS

| | | | |
|---|---|---|---|
| 987,286 | 4/1976 | Canada | 248/334 |
| 836,849 | 4/1952 | Fed. Rep. of Germany | 248/333 |

*Primary Examiner*—Robert A. Hafer
*Attorney, Agent, or Firm*—Wellington M. Manning, Jr.; Luke J. Wilburn, Jr.

[57] ABSTRACT

A unit for suspension support of large objects such as stereo speakers, television sets and the like including at least one elongated strap receivable around an object to be suspended with object plates associated with the strap for placement at different locations around the object. The strap is adjustable so as to be tightly receivable around different sized objects. One of the object plates has an opening therethrough through which a threaded end of a rigid support rod is received. A threaded fastening element is receivable around the threaded end of the rigid rod below the object plate with a free end of the rigid rod being received in an adjustment plate that abuts the object, whereby once the strap has been received around the object and pulled taut, the rod may be adjusted with respect to the threaded nut to lengthen a portion of the rod beneath the object plate and against the adjustment plate to further tighten the body encircling structure around the object. The rigid rod may be adjustable in length and has a securement arrangement at an opposite end of same which is adapted for securement to an overhead support structure.

11 Claims, 4 Drawing Figures

SUSPENSION SUPPORT UNIT FOR LARGE OBJECTS

BACKGROUND OF THE INVENTION

This invention relates to a system for suspension support of large objects such as television sets, stereo speakers and the like. Normally this type item is deployed by placement of the object on the floor, on a table, or the like though in certain situations they have been placed on shelving secured to a wall or supported from the ceiling. The present invention represents improvement in the art in that the object to be suspended may be of various sizes and shapes while continuing to be securely held by the suspension unit. Moreover the unit is capable of a rigid connection between the support system and the object to be supported whereby in the sense of television, stereo speakers, and the like, there is very little if any vibration or movement of the object during suspension that would interfere with visual or aural reception.

SUMMARY OF THE INVENTION

It is an object of the present invention to provide a system for suspension support of relatively large objects from an overhead structure.

Another object of the present invention is to provide an improved means for mounting stereo speakers, television sets, and the like.

Yet another object of the present invention is to provide an improved suspension support system for relatively large objects which is versatile in the sense of size and shape of the object that may be supported.

Still another object of the present invention is to provide an improved mounting system for stereo speakers, television sets, and the like which system is supported from an overhead structure, and securely holds the object to be supported.

Generally speaking the suspension support system of the present invention comprises object encircling means comprising a plurality of object plates for location around the object to be suspended, and at least one elongated element associated with said plates and being receivable around said object, said elongated element having adjustable fastening means associated therewith; an elongated rigid rod means associated with said object encircling means at one end thereof, said rigid rod means having adjustment means associated therewith to produce a rigid connection with said object encircling means; and securement means associated with an opposite end of said rod means and being adapted for securement to an overhead structure.

More specifically the suspension support system for the present invention may include a plurality of generally rectangular plates that are adapted for location around the periphery of an object to be supported, with the plates in a preferred embodiment having a deformable resilient covering on a side thereof that is to come into contact with the object to be suspended. The object plates have associated therewith, preferrably through slots through the plates, at least one strap that passes through the plates and is sufficient in length to extend around the periphery of the object to be suspended. Once the plates are in position, normally on the bottom and top of the object, with the strap around the object, adjustable fastening means on the strap permits the strap to be drawn tight around the object and secured to tightly hold the object plates in the desired positions. In a preferred embodiment two or more straps are utilized.

One of the plates, normally disposed about the top of the object to be supported, has an opening therethrough, through which an elongated rigid rod passes for securement thereto. The rod is capable of adjustment at the top plate to further tighten the body encircling system around the object and better secure same in place, and to afford a rigid connection for the support system. A threaded lower end of the rigid rod preferrably extends through the opening of the plate and is received by a smaller, adjustment plate which rests against the object. A threaded fastening element secured to the top object plate permits adjustment between the object plate and the adjustment plate. With this arrangement, the rigid rod can be rotated to a point where tension is imparted between the object plate and the adjustment plate to perform the further tightening and object securing function.

In a most preferred embodiment, the rigid rod extends upwardly from its connection at the object encircling means and has a plurality of openings therealong. A second rigid rod is telescopically associated with the first rigid rod and has means therewith to locate the second rod with respect to the first rod at one of the openings along the first rod, whereby adjustability in length of the rigid rod means is afforded the system. An opposite end of the rigid rod means receives a securement means which is adapted for permanent securement to an overhead ceiling structure or the like. In a preferred embodiment the securement means is threadedly received around the upper end of the rigid rod means and is adapted for securement to a ceiling per se or passes through an opening in the ceiling and is adapted for securement to rafters or the like above the ceiling.

DESCRIPTION OF THE PREFERRED EMBODIMENTS

Figure 1:
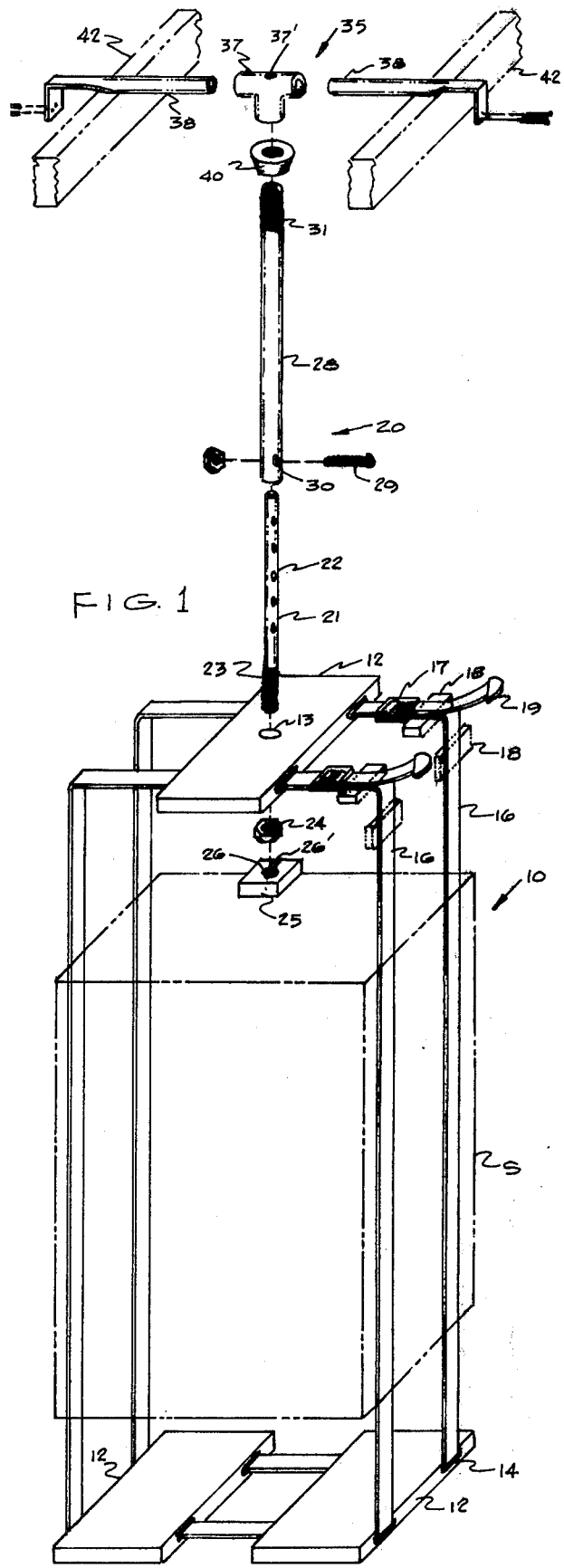
FIG. 1 is an exploded isometric view of a suspension system according to the teachings of the present invention.
Figure 2:
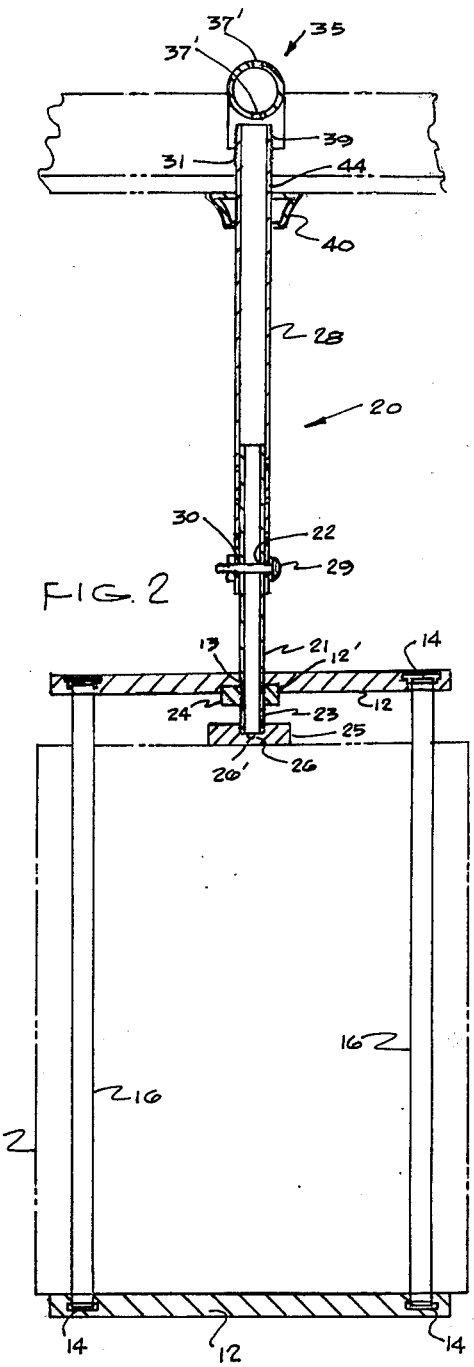
FIG. 2 is a side elevational view in partial cross section of a suspension system as illustrated in FIG. 1 shown supporting a stereo speaker.

Making reference to the Figures preferred embodiments of the present invention will now be described in detail. In FIGS. 1 and 2 an object encircling means generally indicated as 10 is shown being made up of a plurality of object plates 12 that are to be positioned around an object S, such as a stereo speaker, to be suspended. As shown in FIGS. 1 and 2 two plates are preferably located below object S with one object plate 12 being located above the speaker. Elongated strap means 16 are also received around the object S and are associated with the object plates 12 as exemplified by passage of straps 16 through slots 14 located in object plates 12. Strap means 16 are also provided with adjustable fastening means 17 therealong, as exemplified by a buckle, whereby the straps may be pulled taut around the object S and secured in the taut condition by fastening means 17. An outer free end of strap 16 may also be provided with a tip 19 or the like for the purposes of appearance, and also to prevent any fraying or disfigurement of the end of strap 16. Covers 18 (shown in phantom in FIG. 1) may be provided for both the fastening means 17 and the strap tip 19. Covers 18 may be tubular elements received around straps 16 and adapted to slide along strap 16 to cover fastening means 17 and/or the tip 19. Preferably slots 14 on object plates 12 may be enlarged to receive and conceal the buckle 17.

The upper object plate 12 has an opening 13 therethrough through which a rigid rod means generally indicated as 20 is received for securement to the object encircling means 10. Rigid rod means 20 may comprises a single rod or may comprise a plurality of rods as exemplified in FIGS. 1 and 2 by first rod 21 and a second rod 28. In a preferred embodiment a two rod unit is included as illustrated, i.e. one that is adjustable in length. First rod 21 has a plurality of openings 22 along the length of same with a threaded lower end portion 23. Threaded lower end portion 23 extends through opening 13 of object plate 12 and is received by an adjustment plate 25 and an appropriately configured detent 26. Adjustment plate 25 rests against object S with threaded end portion 23 of rod 21 being received therein. A threaded fastening element such as a nut 24 is received between a lower portion of object plate 12 and an upper portion of adjustment plate 25 around threaded lower end portion 23 of rod 21 whereby rod 21 or threaded fastening element 24 may be rotated to extend the distance between adjustment plate 25 and object plate 12 to further tighten the object encircling means 10 around object S. In a most preferred embodiment, a hexagonal or rectangular or other multi-sided threaded nut is provided and is received in a like shaped opening 12 on the underside of object plate 12 (see FIG. 2) whereby threaded fastening element 24 is held against rotation. In this fashion, to further tighten the object encircling means 10 around object S after straps 16 are secured, the rigid rod means 20 is received within the threaded fastening element 24 and is rotated until a taut condition exists for the object encircling means 10 by upward displacement of object plate 12 for adjustment plate 25. Adjustment plate 25 may also have an electrical conductor receiving opening 26' which permits passage of an electrical conductor through the rigid rod means.

Second rigid rod 28 has an opening 30 adjacent a lower end of same through which a fastening member 29 is received. Rod 28 is telescopically received over first rod 21 and at a desired length, opening 30 is matched up with one of the openings 22 along rod 21 and fastening pin 29 is passed therethrough to secure first rod 21 and second rod 28 at the desired length.

An opposite end of second rod 28 is provided with a securement means generally indicated as 35 for securing the system to an overhead support structure. As shown in FIGS. 1 and 2 a bracket 37 having a threaded socket 39 is provided having legs 38 extending outwardly therefrom and being securable to rafters 42 located above a normal ceiling. With an appropriate opening 44 in the ceiling, an upper threaded end 31 of second rod 28 passes through same and is threadedly connected to threaded socket 39 of bracket 37. For the purposes of appearance, a ferrule 40 is received around second rod 28 to be located at the ceiling level to cover opening 44 through which threaded rod portion 31 passes. Bracket 37 also may have appropriate openings 37' through which an electrical conductor may pass.

A stereo speaker mounted as described above may be suspended from a ceiling and will provide excellent audio fidelity while remaining indefinitely securely suspended.

Figure 4:
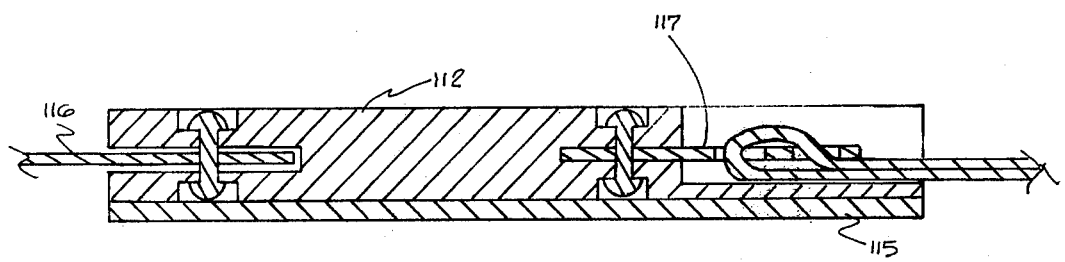
FIG. 4 illustrates a further embodiment of a strap fastening means according to the teachings of the present invention.

As mentioned above, the desired object to be suspended may be of various sizes and shapes. As such, in a preferred embodiment (see FIG. 4) object plates 112 may be provided with resilient deformable pads 115 that are secured to an object contact side of same. Pads 115 will thus contact with the object to avoid any marring or other disfigurement of the object. Additionally, pad 115 will deform according to the surface contour of the object to better provide a contact surface between the object plates 112 and the object S. As further shown in FIG. 4 a modified strap securement means is provided. One end of a strap 116 is secured to top plate 112 by a pin 113 or the like. An opposite end of strap 116 passes into a cut out portion 114 of object plate 112 where it passes around a knurled rod 117 or the like. With this arrangement, fastening means for strap 116 are secreted from view above the top of the object.

Figure 3:
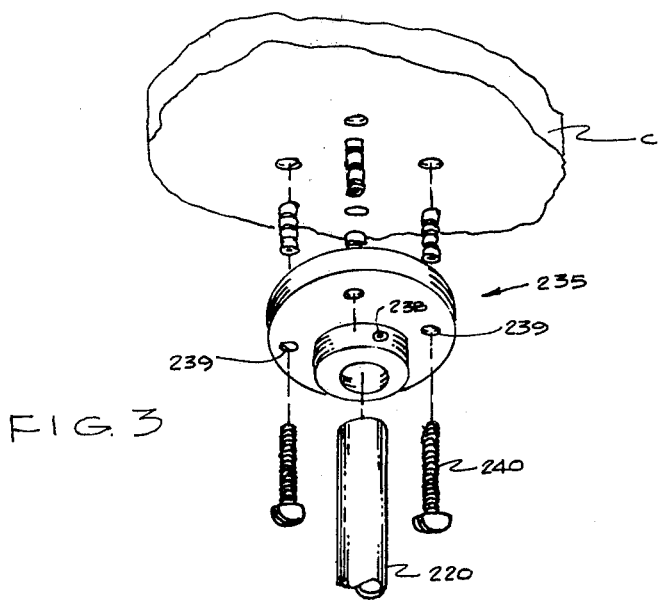
FIG. 3 illustrates a further embodiment of an overhead securement means according to the teachings of the present invention.

As shown in FIG. 3, a modified overhead securement means 235 is illustrated, including a flange 237 having a set screw 238 through the side of same. The set screw arrangement may also be provided on the securement means illustrated in FIGS. 1 and 2. Flange 237 further has a plurality of openings 239 around threaded portion 238 through which screws or the like 240 may pass for securement into a concrete ceiling C or the like.

According to the teachings of the present invention, the strap means that are received around the object are preferably a flexible material made of a woven fabric or the like. Likewise, the object plates are preferably a wooden construction with the wood finished to an appropriate decor to blend with the object to be supported. In a most preferred embodiment, two pieces of wood are employed for each plate with one of the pieces or both of the pieces being routed to define portions for the slots for receiving the strap means, after which the two wooden pieces are adhesively secured together to define the complete slot. Likewise, the rigid rod means is preferably of metal tubular construction with appropriate surface decor to blend with the overall system.

Having described the present invention in detail, it is obvious that one skilled in the art will be able to make variations and modifications thereto without departing from the scope of the invention. Accordingly, the scope of the present invention should only be determined by the claims appended hereto.

What is claimed is:

1. A suspension support for large objects comprising:
   (a) object encircling means comprising a plurality of object plates for location around an object to be suspended, and at least one elongated element associated with said plates and being receivable around said object, said elongated element having adjustable fastening means associated therewith;
   (b) an elongated rigid rod means associated with said object encircling means at one end thereof, said rigid rod means having adjustment means associated therewith to produce an adjustable rigid connection with said object encircling means and providing a tight relationship between said object encircling means and said object; and (c) securement means associated with an opposite end of said rigid rod means and being adapted for securement to an overhead structure.

2. A suspension support for large objects as defined in claim 1 wherein said object plates have a slot therethrough through which said elongated element passes.

3. A suspension support for large objects as defined in claim 1 wherein said elongated element is a strap.

4. A suspension support for large objects as defined in claim 1 wherein said elongated rigid rod means is associated with one of said object plates, said rod passing through said object plate and a threaded member secured to said object plate into contact with an adjustment plate, whereby said rod may be rotated to adjust same with respect to said object encircling means.

5. A suspension support for large objects as defined in claim 1 wherein said securement means comprise a bracket having a threaded element therealong for receipt of an end of said rigid rod, said bracket being adapted for attachment to overhead support members.

6. A suspension support for large objects as defined in claim 1 wherein said elongated rigid rod means comprises a pair of rods, said rods having connection means therealong for length adjustment of the rod means.

7. A suspension support for large objects comprising:
(a) object encircling means comprising a plurality of object plates for location around an object to be supported, at least one elongated element receivable around said object and associated with said plates, said at least one elongated element having fastening means thereon for securement of same around said object, one of said plates having an opening therethrough and at least certain of said plates having a deformable surface thereon, said surface conforming at least in part to the surface contour of the object at said plate;

(b) a first rigid elongated rod receivable through said opening in said plate, said first rigid rod having a threaded end portion;

(c) an adjustment plate means receivable between said threaded end portion of said rigid rod and said object and threaded locking means associated with said rigid rod to permit adjustment of the distance from said object plate having an opening therethrough and said object to ensure a tight rigid connection between said object and said rigid rod;

(d) a second rigid elongated rod telescopically receivable along a portion of the length of said first rigid rod, said rods having means associable therewith for securement of same at different locations whereby the length of said connected rods may be varied; and (e) securement means operatively associated with said second rigid elongated rod and adapted for securement to an overhead structure.

8. A suspension support for large objects as defined in claim 7 wherein said object plates have slots therethrough which said elongated element passes.

9. A suspension support for large objects as defined in claim 8 wherein a plurality of elongated elements are included, said elements being flexible straps.

10. A suspension support for large objects as defined in claim 9 wherein said securement means comprise a bracket having a threaded opening thereby for receipt of an end of said second rigid elongated element, said bracket being adapted for attachment to overhead support members.

11. A suspension support for large objects as defined in claim 9 wherein the securement means comprise a bracket having an opening into which the rigid elongated element may pass, said bracket further having means contactable with said element therein to secure same in place.

* * * * *